US012261396B2

(12) United States Patent
Chen et al.

(10) Patent No.: US 12,261,396 B2
(45) Date of Patent: Mar. 25, 2025

(54) CIRCUIT BOARD FOR INSERTING EXPANSION CARD

(71) Applicant: ASUSTeK COMPUTER INC., Taipei (TW)

(72) Inventors: Po-Ting Chen, Taipei (TW); Chang-Hung Chen, Taipei (TW); Chih-Hung Chuang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 372 days.

(21) Appl. No.: 17/952,346

(22) Filed: Sep. 26, 2022

(65) Prior Publication Data

US 2023/0396022 A1 Dec. 7, 2023

(30) Foreign Application Priority Data

Jun. 1, 2022 (TW) ................................. 111120365

(51) Int. Cl.
*H01R 13/635* (2006.01)
*H01R 12/73* (2011.01)
*H01R 13/627* (2006.01)

(52) U.S. Cl.
CPC ......... *H01R 13/635* (2013.01); *H01R 12/737* (2013.01); *H01R 13/6275* (2013.01)

(58) Field of Classification Search
CPC .............. H01R 13/635; H01R 13/6275; H01R 12/721; H01R 12/73; H01R 12/737; G06F 1/185
USPC .......................................................... 439/327
See application file for complete search history.

(56) References Cited

U.S. PATENT DOCUMENTS

| | | | | |
|---|---|---|---|---|
| 6,059,585 A * | 5/2000 | Liao | H01R 12/721 | 439/157 |
| 6,672,888 B1 * | 1/2004 | Ku | H01R 12/7005 | 439/153 |
| 6,746,256 B1 * | 6/2004 | Wang | H01R 13/633 | 439/159 |
| 7,029,298 B2 * | 4/2006 | Jiang | H01R 13/641 | 439/157 |

(Continued)

FOREIGN PATENT DOCUMENTS

| | | | |
|---|---|---|---|
| CN | 201732320 | 2/2011 | |
| CN | 101420082 B * | 3/2011 | H01R 12/7029 |

(Continued)

*Primary Examiner* — Marcus E Harcum
(74) *Attorney, Agent, or Firm* — JCIPRNET

(57) ABSTRACT

A circuit board is for inserting an expansion card with a positioning part. The circuit board includes a board body, a slot, a release assembly, and a transmission mechanism. The release assembly includes a release body, a blocking member, and an elastic member connected between the release body and the blocking member. The release body includes a blocking part for limiting the positioning part. The transmission mechanism includes a linkage part and a force applying part. When the force applying part receives an external force, the linkage part moves to move the release assembly toward a first direction, the elastic member returns to an original position to drive the blocking member to push against the positioning part to move out of the blocking part and to be located at a release position continuously, so as to release the limit of the positioning part by the blocking part.

9 Claims, 11 Drawing Sheets

(56) References Cited

U.S. PATENT DOCUMENTS

| | | | | | |
|---|---|---|---|---|---|
| 7,789,692 | B2 * | 9/2010 | Lee | H01R 13/6275 | 439/328 |
| 7,866,995 | B1 * | 1/2011 | Kudo | H01R 12/7005 | 439/157 |
| 7,918,683 | B1 * | 4/2011 | Hamner | H01R 12/87 | 439/377 |
| 8,235,738 | B2 * | 8/2012 | Li | H01R 13/639 | 439/347 |
| 8,730,668 | B2 | 5/2014 | Hu et al. | | |
| 9,935,384 | B1 * | 4/2018 | Li | H01R 13/6335 | |
| 10,301,845 | B2 * | 5/2019 | Hsu | E05B 47/023 | |
| 2007/0105448 | A1 * | 5/2007 | Ju | H01R 12/7005 | 439/636 |
| 2007/0123076 | A1 * | 5/2007 | Sabo | H01R 12/721 | 439/157 |
| 2011/0021045 | A1 * | 1/2011 | Tan | H01R 13/7172 | 439/153 |
| 2012/0156912 | A1 * | 6/2012 | Shen | H01R 13/6275 | 439/327 |
| 2012/0244734 | A1 * | 9/2012 | Fu | H01R 13/648 | 439/637 |
| 2013/0309892 | A1 * | 11/2013 | Chen | H01R 12/7029 | 439/327 |
| 2021/0278880 | A1 | 9/2021 | Chang et al. | | |
| 2023/0178935 | A1 * | 6/2023 | Lai | H01R 13/6275 | 439/62 |
| 2023/0180389 | A1 * | 6/2023 | Lai | H01H 13/20 | |
| 2023/0180418 | A1 * | 6/2023 | Lai | G06F 1/186 | 361/759 |

FOREIGN PATENT DOCUMENTS

| | | | | | |
|---|---|---|---|---|---|
| CN | 102811573 | | | 6/2015 | |
| CN | 113359951 | | | 9/2021 | |
| EP | 3534290 | B1 | * | 1/2021 | G06K 13/085 |
| TW | 1474564 | B | * | 2/2015 | |

* cited by examiner

CIRCUIT BOARD FOR INSERTING EXPANSION CARD

CROSS-REFERENCE TO RELATED APPLICATION

This application claims the priority benefit of Taiwan application serial no. 111120365, filed on Jun. 1, 2022. The entirety of the above-mentioned patent application is hereby incorporated by reference herein and made a part of this specification.

BACKGROUND

Technical Field

The disclosure relates to a circuit board, and more particularly, to a circuit board suitable for inserting an expansion card.

Description of Related Art

Generally speaking, to release a graphics card inserted in a slot on a motherboard is about to be released, a graphics card release structure (the release structure commonly known as whale tail) beside a turning slot is used to release the restriction on an expansion card. However, with the improvement of the specifications of related equipment around the motherboard (such as, the increase in dimensions of a CPU tower radiator, the larger size of heat dissipation elements, the increase in the number of exterior decorative members, etc.), after the graphics card is inserted into the slot, most of the area of the graphics card release structure is blocked, making it difficult for users to press.

At present, the users often use other tools to press the graphics card release structure. However, doing so often results in damage to the graphics card release structure, and the graphics card release structure is not easy to press. The elements on the motherboard may even be damaged, resulting in the inability to readily release/replace the graphics card. In addition, with the improvement of the specification of the graphics card, the weight of the graphics card also increases. If the users wants to pull out the graphics card with the assistance of both hands, actuations of pressing the graphics card release structure and pulling out the graphics card may not be achieved at the same time, resulting in unsmooth release/replacement of the graphics card, and resulting in poor user experience.

SUMMARY

The disclosure provides a circuit board suitable for inserting an expansion card. The expansion card includes a positioning part. The circuit board includes a board body, a slot, a release assembly, and a transmission mechanism. The slot is disposed on the board body. The release assembly is movably disposed beside the slot along a first direction. The release assembly includes a release body, a blocking member, and an elastic member. The release body includes a blocking part suitable for limiting the positioning part. The blocking member is pivotally connected to the release body. The elastic member is connected between the release body and the blocking member. The transmission mechanism includes a linkage part and a force applying part that are linked with each other. The linkage part is connected to the release assembly.

When the force applying part receives an external force, the linkage part moves to move the release assembly toward the first direction, and the elastic member returns to an original position to drive the blocking member to push against the positioning part to move out of the blocking part and to be located at a release position continuously, so as to release limit of the positioning part by the blocking part.

Based on the above, in the circuit board of the disclosure, the release assembly moves relative to the slot by pressing the force applying part of the transmission mechanism, and through the configuration of the blocking member and the elastic member in the release assembly, when the release assembly moves relative to the slot, the blocking member is driven to push against the positioning part of the expansion card to move out of the blocking part, so as to be located at the release position continuously. In this way, the user does not need to continuously press the force applying part to release the expansion card, which is convenient for the user to operate and has the good user experience.

DETAILED DESCRIPTION OF DISCLOSED EMBODIMENTS

Figure 1:
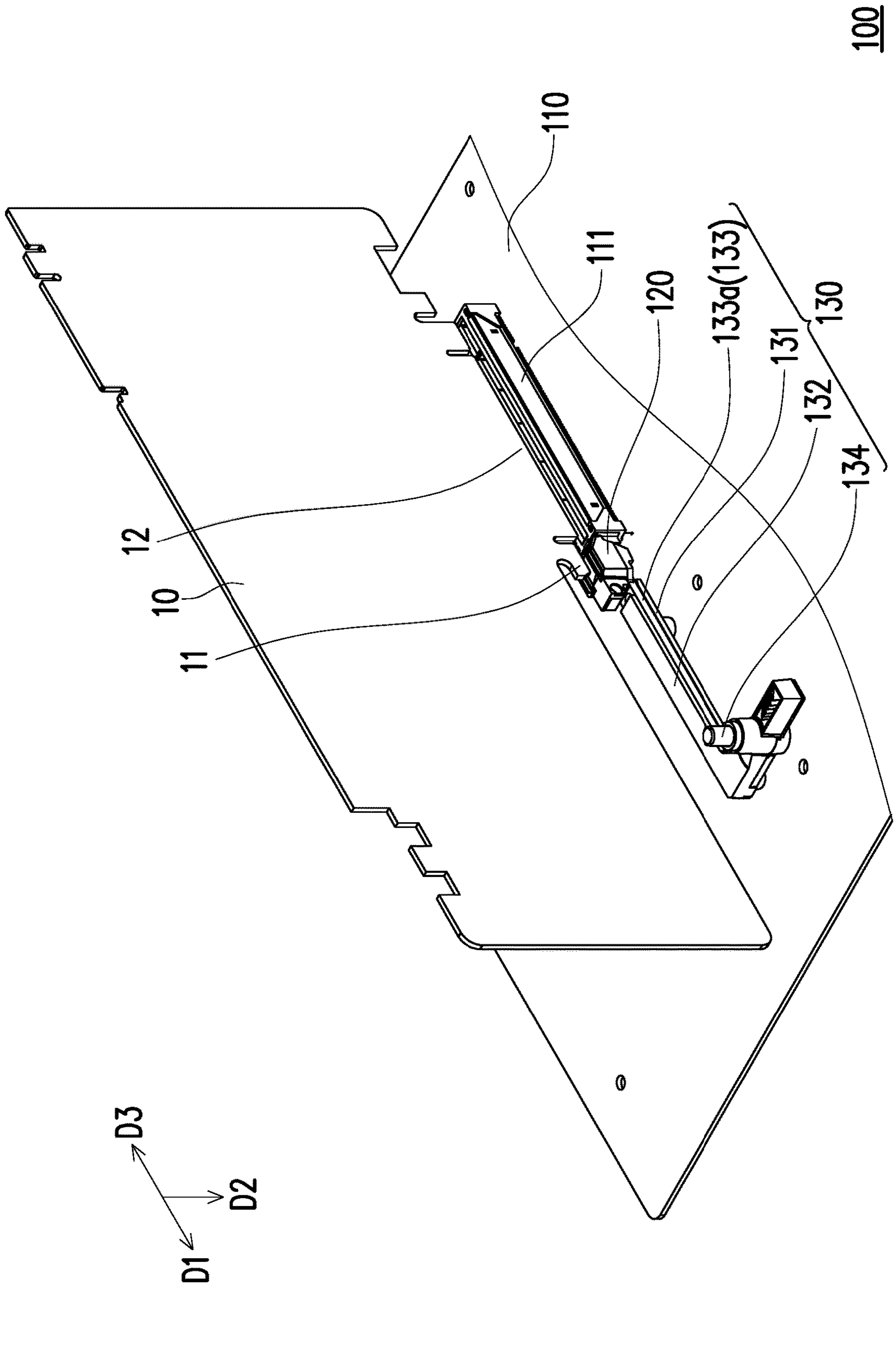
FIG. 1 is a perspective view of a circuit board and an uninserted expansion card according to an embodiment of the disclosure.

Referring to FIG. 1, a circuit board 100 is provided, and the circuit board 100 is suitable for inserting an expansion card 10. In an embodiment, the expansion card 10 is, for example, a graphics card, but a type of the expansion card 10 is not limited thereto. The expansion card 10 includes a positioning part 11 and an inserting part 12. The expansion card may be electrically connected to the circuit board 100 through the inserting part 12.

The circuit board 100 includes a board body 110, a slot 111, a release assembly 120, and a transmission mechanism 130. The slot 111 is disposed on the board body 110 for inserting the inserting part 12 of the expansion card 10. In an embodiment, the slot 111 is, for example, a PCI-E slot, but a type of the slot 111 is not limited thereto.

Figure 4:
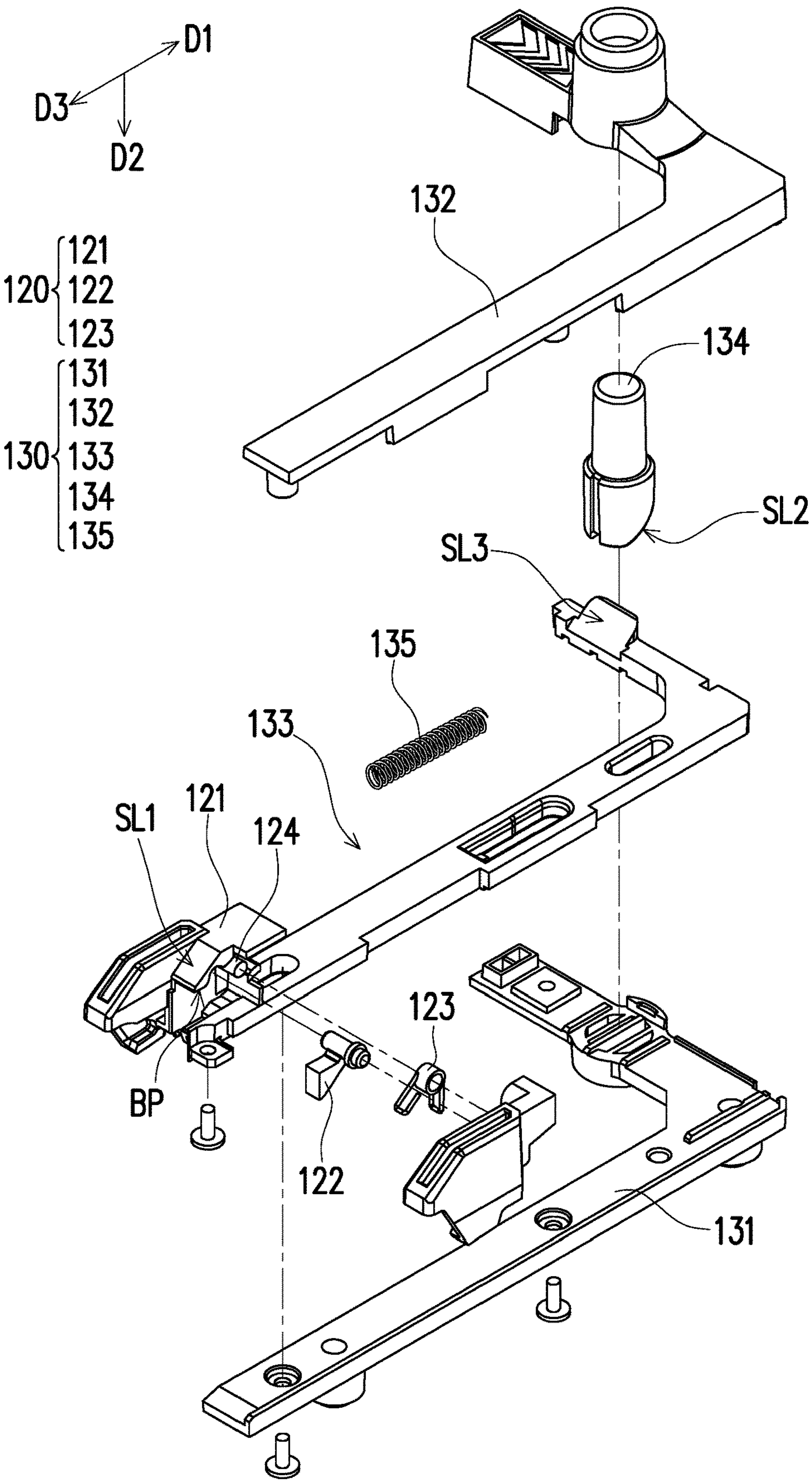
FIG. 4 is an exploded view of FIG. 2.
Figure 5A:
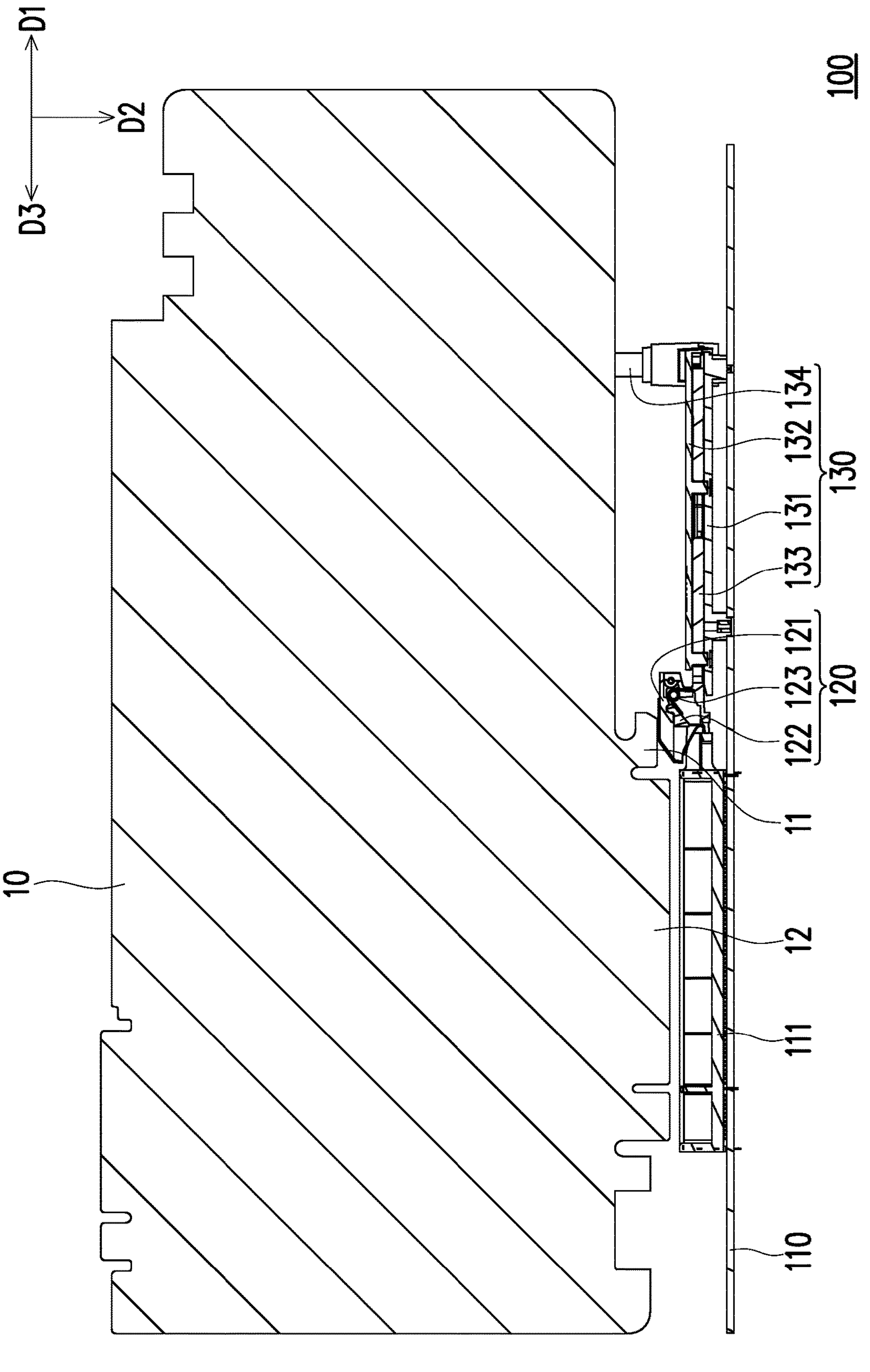
FIG. 5A is a cross-sectional side view of FIG. 1.
Figure 5B:
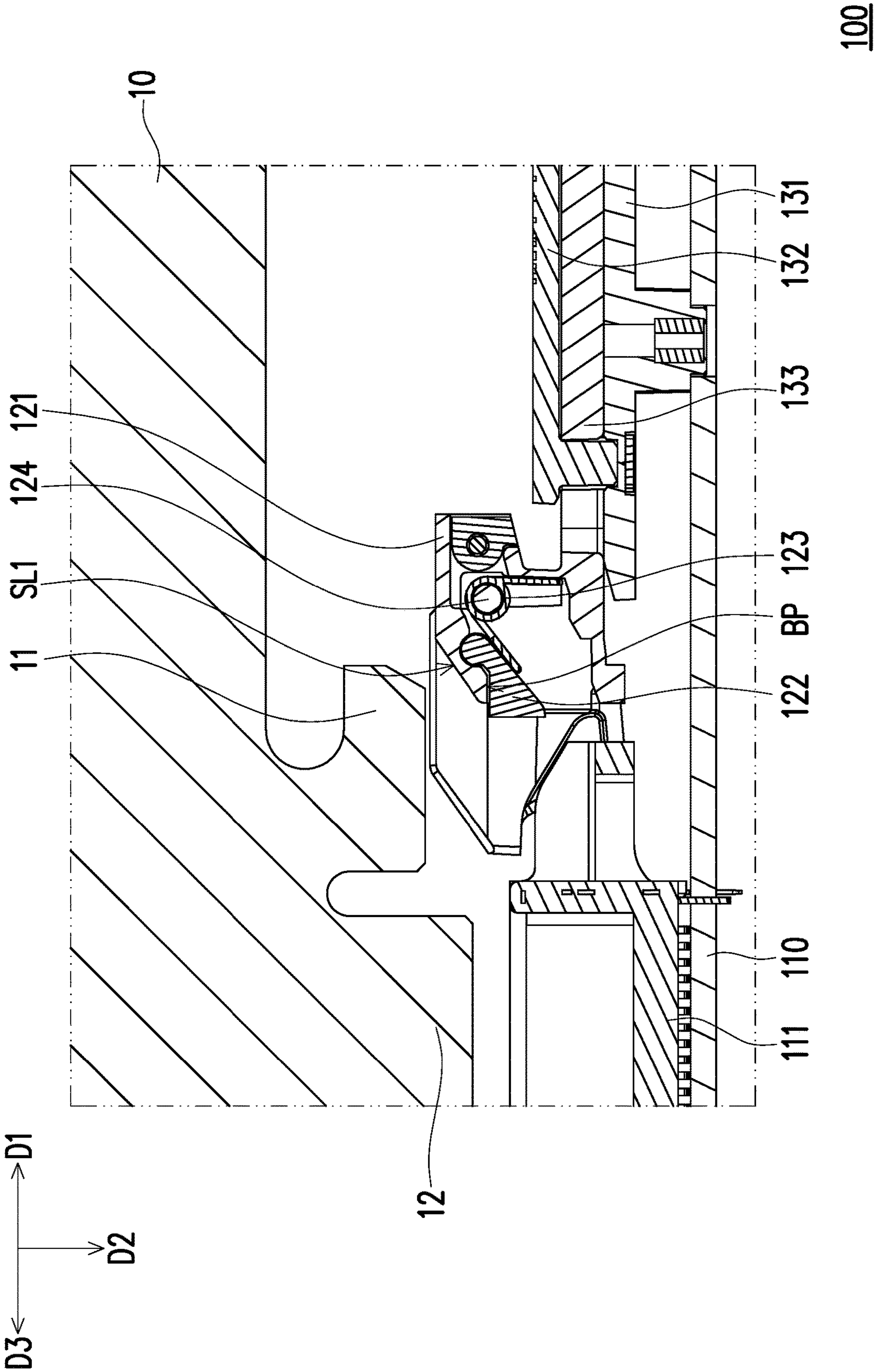
FIG. 5B is a partial enlarged view of FIG. 5A.

Referring to FIGS. 1 and 4, in an embodiment, the release assembly 120 is movably disposed beside the slot 111 along a first direction D1 (FIG. 1), and includes a release body 121, a blocking member 122, and an elastic member 123 (FIG. 4).

As shown in FIG. 4, in an embodiment, the release body 121 includes a blocking part BP suitable for limiting the positioning part 11 and a first inclined surface SL1, and the blocking part BP is located below the first inclined surface SL1 (FIG. 4). The blocking member 122 is pivotally connected to the release body 121. The elastic member 123 is connected between the release body 121 and the blocking member 122. The elastic member 123 is configured to help the blocking member 122 to return to an original position.

In an embodiment, the release body 121 includes a protruding post 124. The elastic member 123 is sleeved on the protruding post 124. One end of the elastic member 123 is abutted against the release body 121, and the other end is abutted against the blocking member 122. In an embodiment, the elastic member 123 is, for example, a reed, but the disclosure is not limited thereto.

Figure 2:
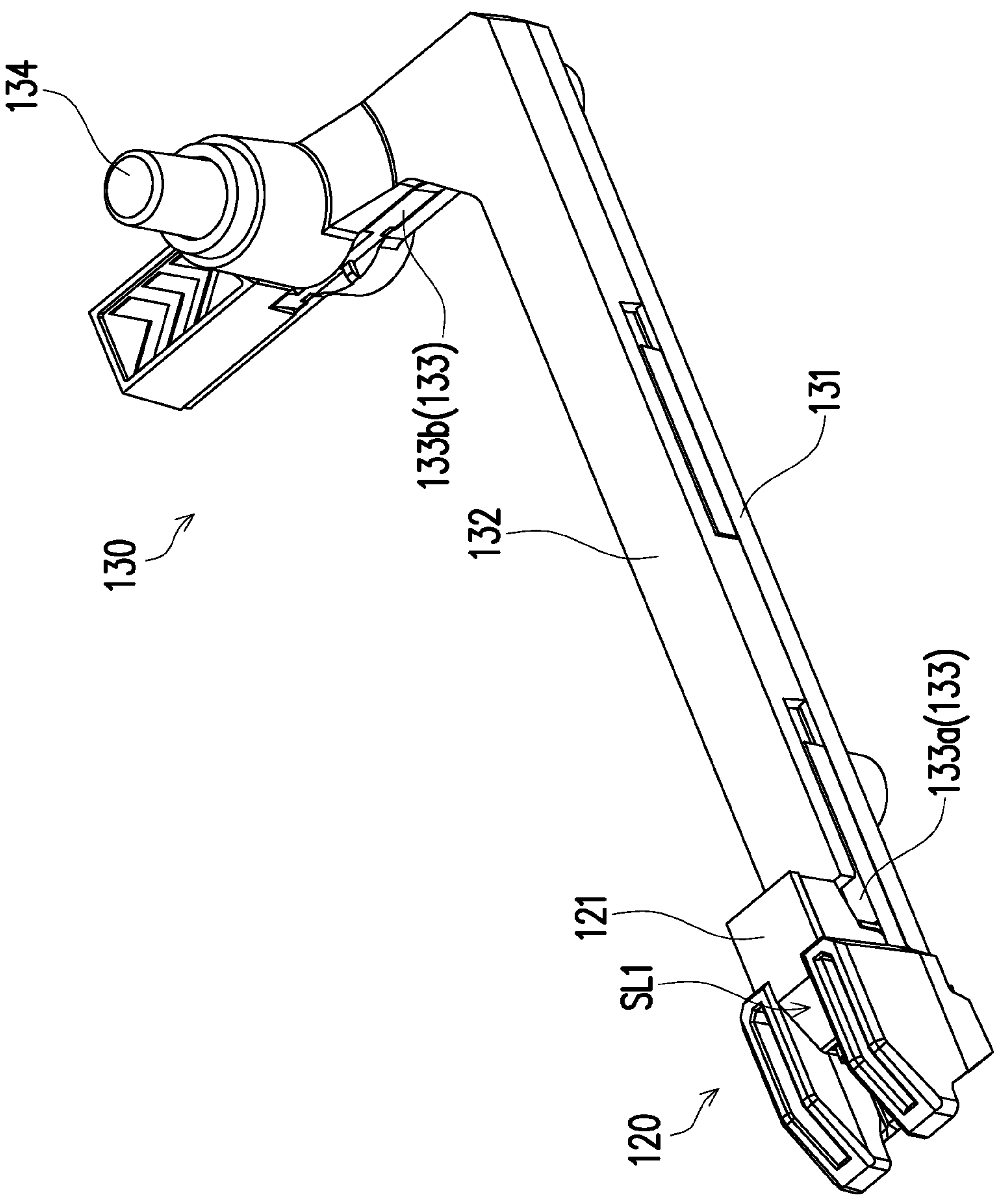
FIG. 2 is a perspective view of a release assembly and a transmission mechanism of FIG. 1.
Figure 3:
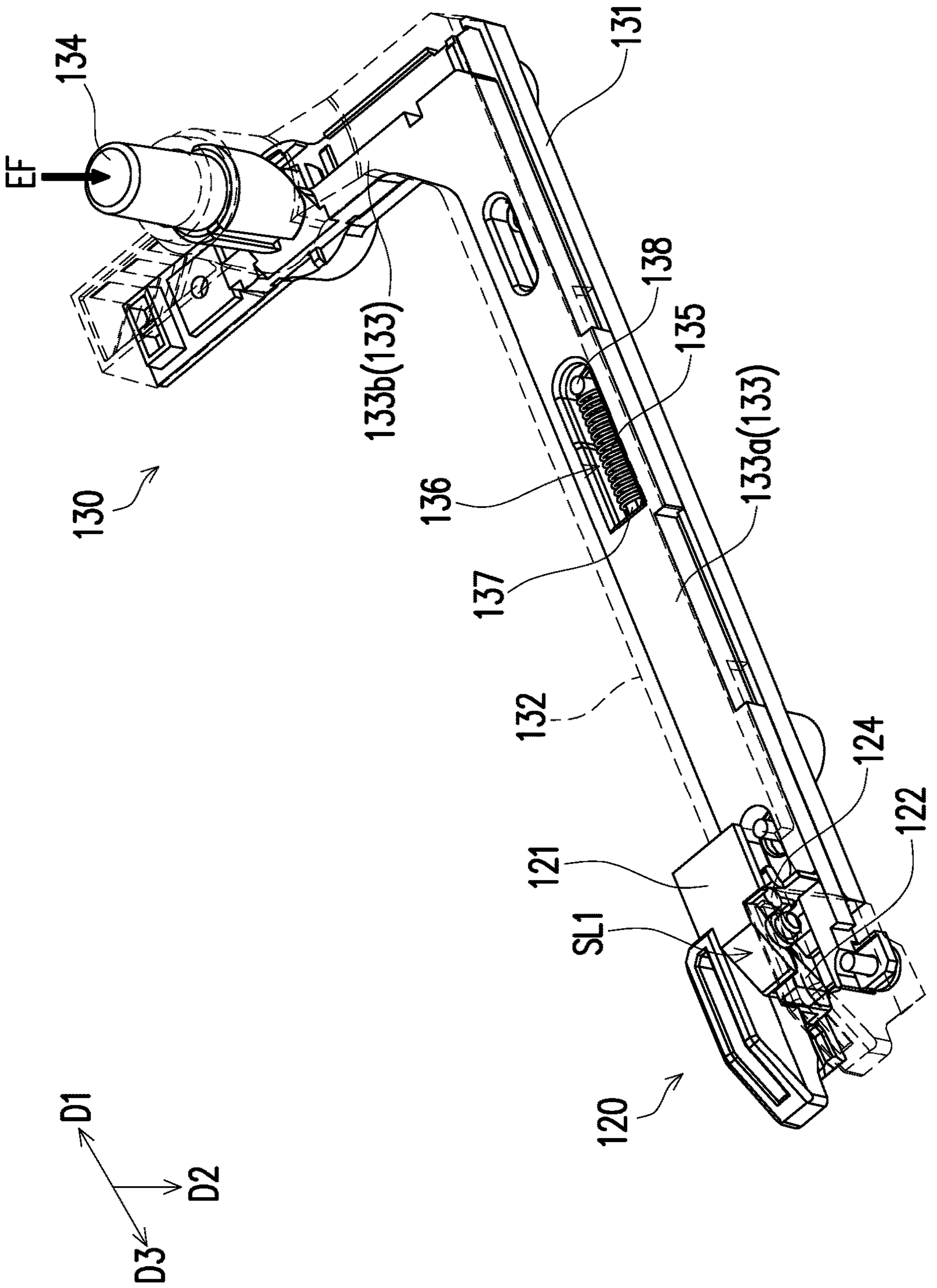
FIG. 3 is a partial perspective view of FIG. 2.

Referring to FIGS. 2 to 4, in an embodiment, the transmission mechanism 130 includes a base body 131, an upper cover 132 disposed on the base body 131, a linkage part 133 and a force applying part 134 linked with each other. The base body 131 is fixed to the board body 110 (FIG. 1), and the upper cover 132 is fixed to the base body 131. In an embodiment, a fixing method among the board body 110, the base body 131, and the upper cover 132 is, for example, screw connection, but the disclosure is not limited thereto.

As shown in FIG. 3, in an embodiment, the linkage part 133 is movably disposed between the base body 131 and the upper cover 132 along the first direction D1. In an embodiment, the transmission mechanism 130 further includes an elastic member 135. The elastic member 135 is located between the base body 131 and the upper cover 132, extends along the first direction D1, and presses against the linkage part 133. The elastic member 135 is configured to help the linkage part 133 to return to the original position.

In an embodiment, the linkage part 133 includes a groove 136 and a protruding post 137 located in the groove 136. A column 138 fixed to the base body 131 extends into the groove 136. The elastic member 135 is located in the groove 136. One end of the elastic member 135 is sleeved on the protruding post 137, and the other end is abutted against the column 138 fixed to the base body 131.

Referring to FIGS. 2 and 3, in an embodiment, the linking part 133 includes a first part 133*a* and a second part 133*b* connected to the first part 133*a* in a bending manner. The release assembly 120 is connected to the first part 133*a*, and the force applying part 134 is close to second part 133*b*.

In an embodiment, an angle between the first part 133*a* and the second part 133*b* is, for example, 90 degrees, but the disclosure is not limited thereto.

Referring to FIG. 1, in an embodiment, the slot 111 and the first part 133*a* extend along the first direction D1 and are located on the same extension line, and the force applying part 134 is staggered from the extension line of the slot 111. Such a design may prevent the force applying part 134 from being blocked by the expansion card 10 and a heat dissipation module disposed on the expansion card 10, which is convenient for a user to operate.

Referring to FIGS. 3 and 4, in an embodiment, the force applying part 134 includes a button movably disposed on the base body 131 along a second direction D2. The second direction D2 is different from the first direction D1. In this embodiment, the first direction D1 is perpendicular to the second direction D2, but a relationship between the first direction D1 and the second direction D2 is not limited thereto.

As shown in FIG. 4, in an embodiment, the button includes a second inclined surface SL2, and the linkage part 133 includes a third inclined surface SL3 corresponding to the second inclined surface SL2. When the button is pressed along the second direction D2, the second inclined surface SL2 cooperates with the third inclined surface SL3, so that the linkage part 133 moves toward the first direction D1. In this way, the release assembly 120 connected to the linkage part 133 move toward the first direction D1 to release the restriction on the expansion card 10.

Hereinafter, actuations of inserting the expansion card 10 into the slot 111 and releasing the expansion card 10 from the release assembly 120 are further described.

Figure 6:
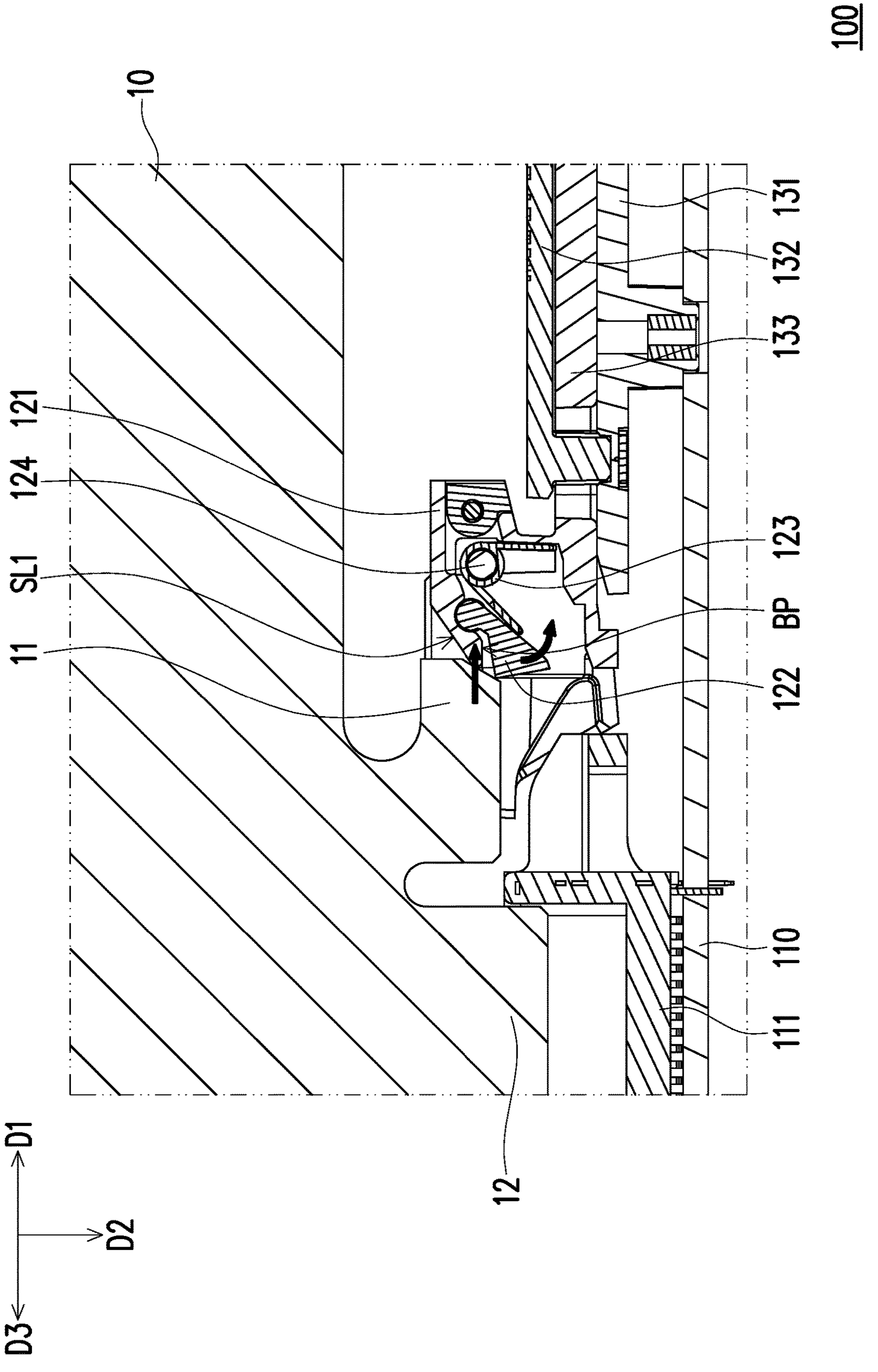
FIGS. 6 to 8 are partial cross-sectional side views of the expansion card of FIG. 1 moving down to be in contact with the release assembly.
Figure 7:
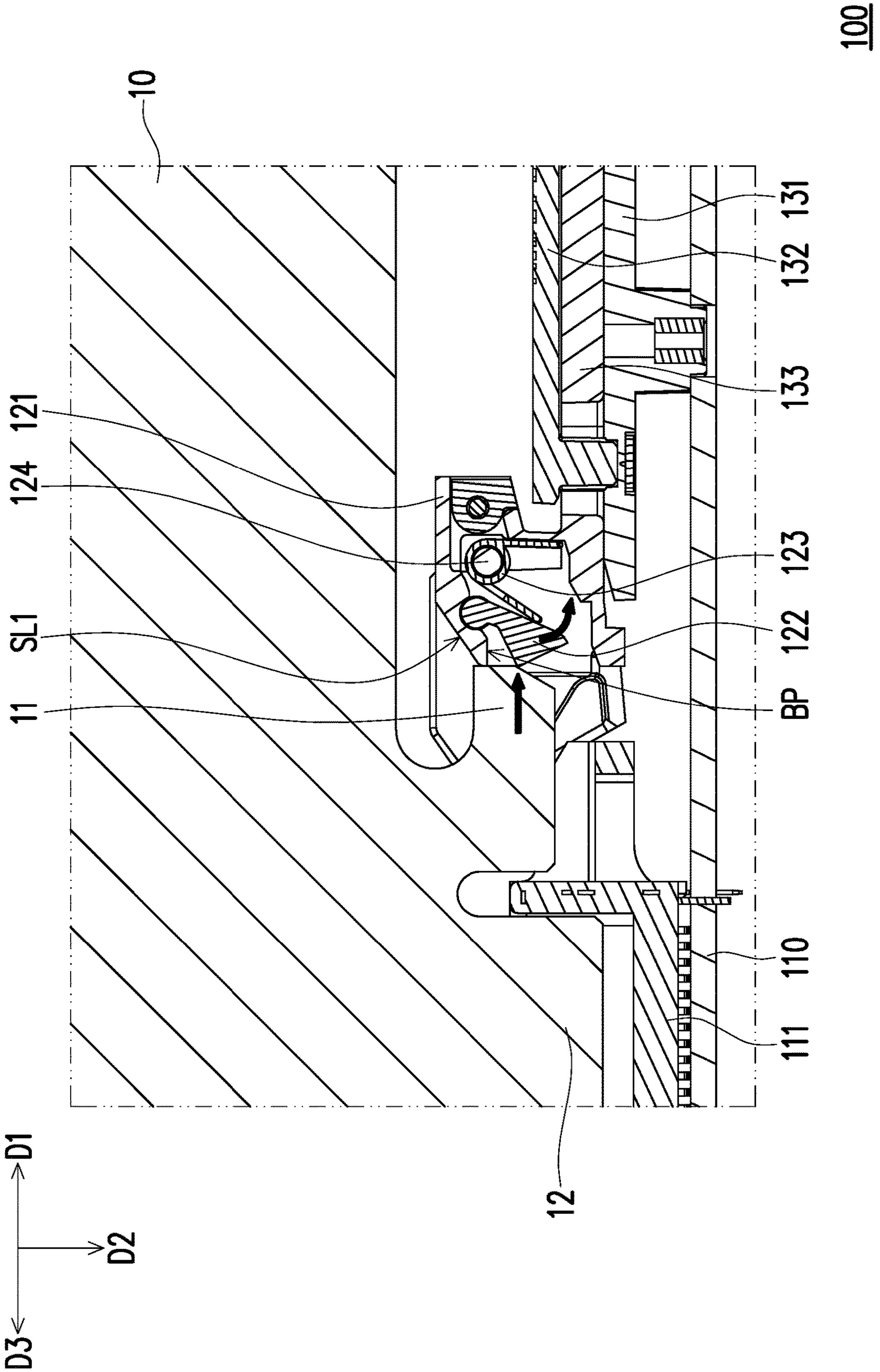

Referring to FIGS. 5A to 7, when the expansion card 10 is to be inserted into the slot 111 along the second direction D2 (FIGS. 5A and 5B), and is not limited by the blocking part BP (FIGS. 6 and 7), the positioning part 11 of the expansion card 10 pushes against the first inclined surface SL1 and the blocking member 122, so that the release assembly 120 moves toward the first direction D1 (as shown by arrows pointing to the right in FIGS. 6 and 7), and the blocking member 122 pivots relative to the release body 121 (as shown by counterclockwise arrows in FIGS. 6 and 7). During the process, the elastic member 135 (FIG. 3) accumulates elastic potential energy.

Figure 8:
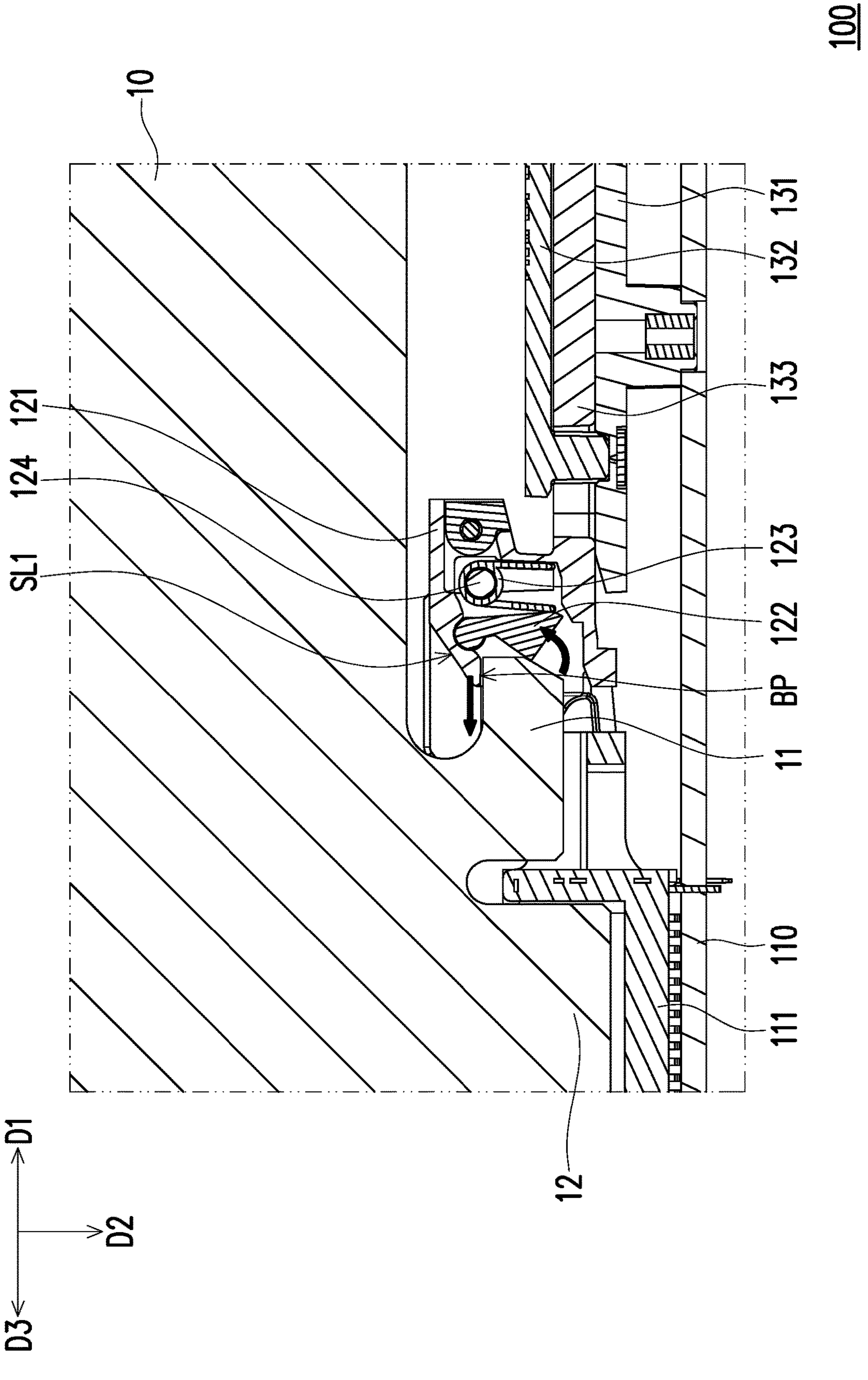

Next, referring to FIG. 8, when the expansion card 10 continues to be inserted into the slot 111 along the second direction D2, the positioning part 11 of the expansion card 10 moves to a bottom of the first inclined surface SL1 of the release assembly 120 and is limited by the blocking part BP, and the positioning part 11 still pushes against the blocking member 122 and pivots relative to the release body 121 (as shown by a counterclockwise arrow in FIG. 8).

Figure 9:
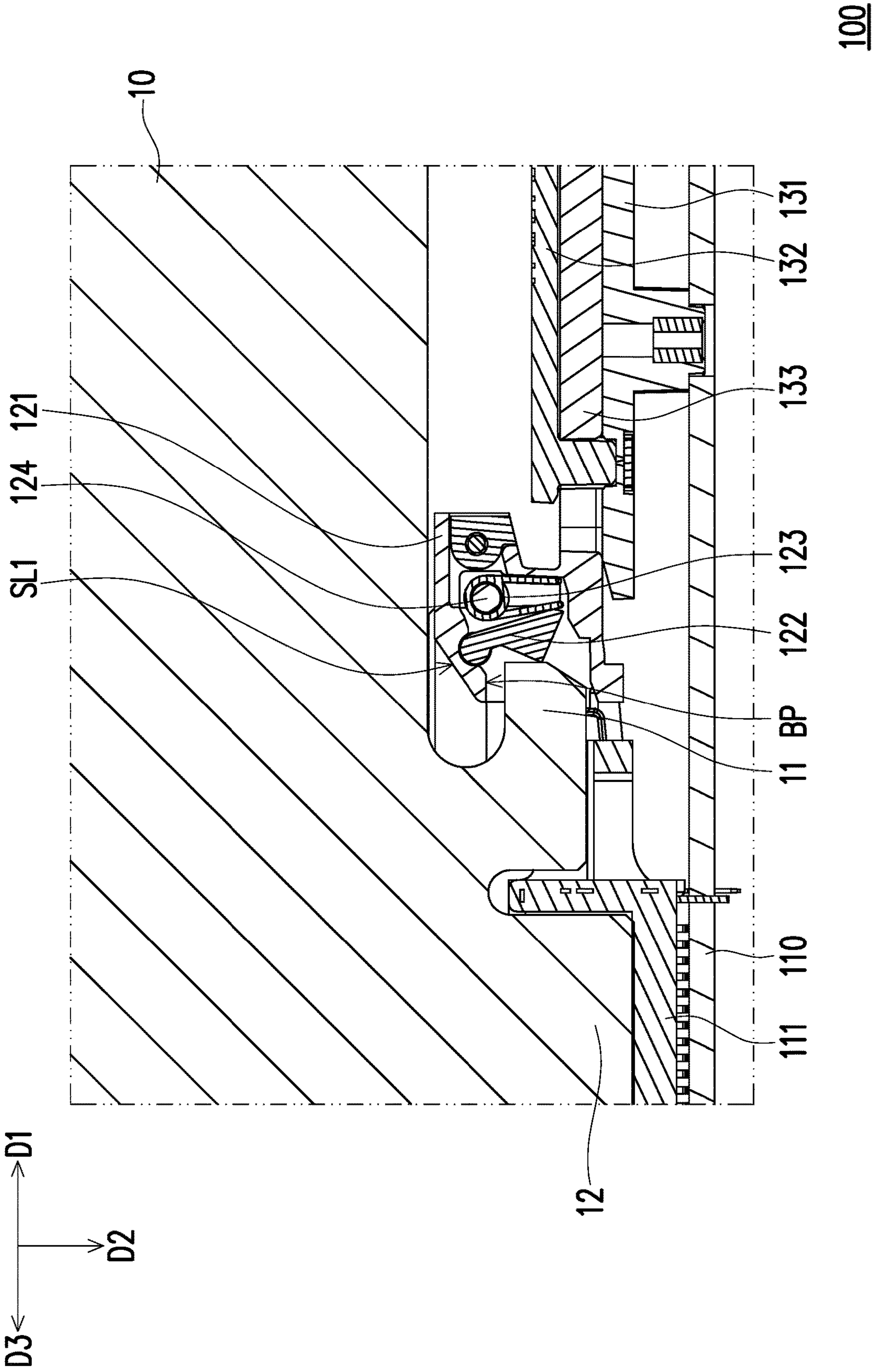
FIG. 9 is a partial cross-sectional side view of the expansion card of FIG. 1 inserted into a slot.

At this time, since the first inclined surface SL1 is no longer pushed by the positioning part 11 of the expansion card 10, the elastic member 135 (FIG. 3) releases the elastic potential energy and pushes the release assembly 120 to move toward a third direction D3 opposite to the first direction D1 (as shown by an arrow pointing to the left in FIG. 8) to return to the original position until the inserting part 12 of the expansion card 10 completes the actuation of being inserted into the slot 111, so that the positioning part 11 of the expansion card 10 is restricted by the blocking part BP and may not move upward (FIG. 9).

Subsequently, if the user wants to release or replace the expansion card 10, the user may press the force applying part 134 (i.e. the button). Therefore, when the force applying part 134 receives an external force EF as shown in FIG. 3, the force applying part 134 drives the linkage part 133 to move when moving down along the second direction D2, so that the release assembly 120 moves toward the first direction D1 (as shown by an arrow pointing to the right in FIG. 10), and the elastic member 123 returns to the original position.

Figure 10:
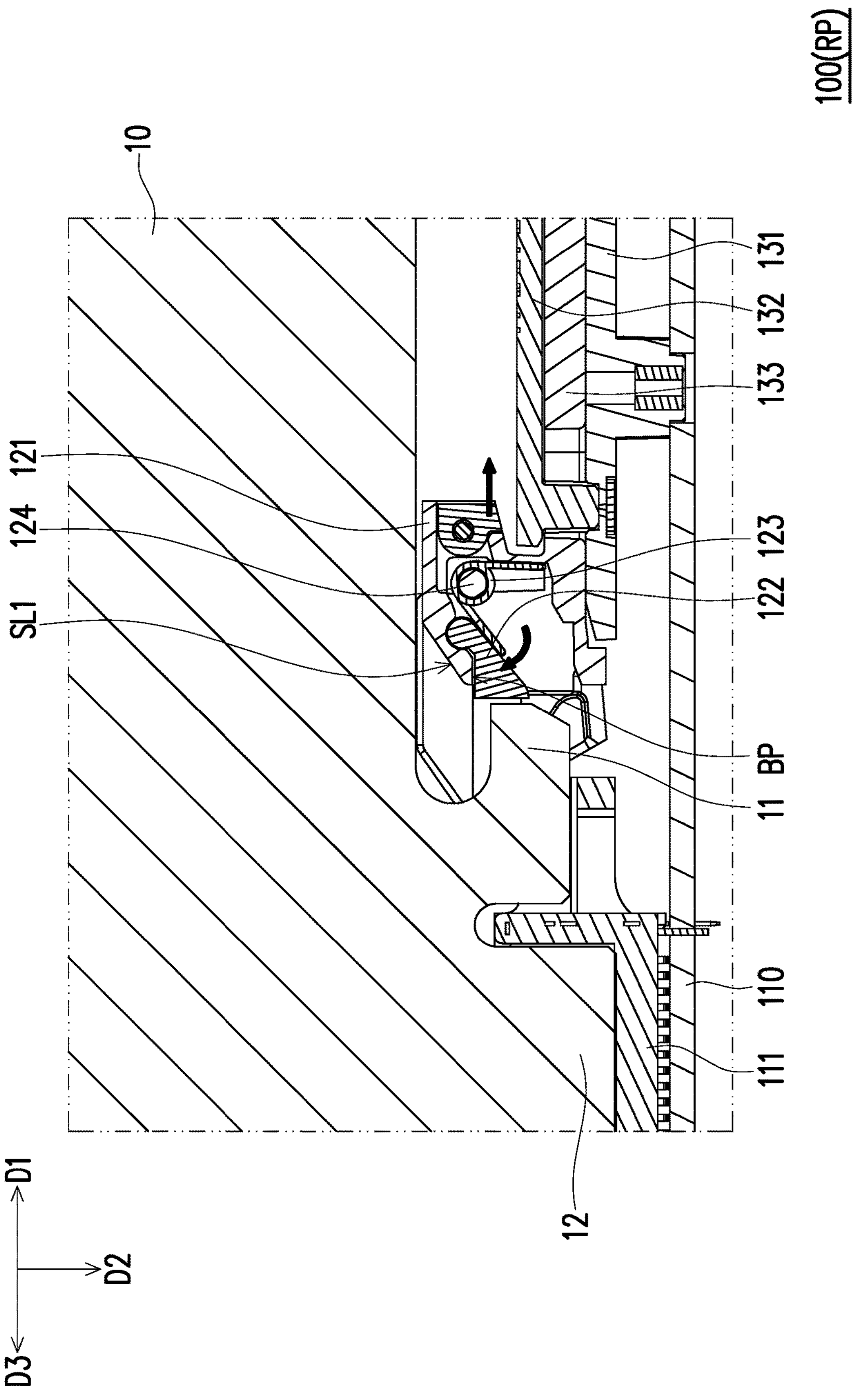
FIG. 10 is a partial cross-sectional side view of the release assembly of FIG. 1 continuously located at a release position.

At this time, as shown in FIG. 10, the elastic member 123 drives the blocking member 122 to push against the positioning part 11 to move out of the blocking part BP and to be located at a release position RP continuously. Finally, before the expansion card 10 is completely separated from the circuit board 100, the circuit board 100 may be located at the release position RP (FIG. 10) continuously. After the expansion card 10 is pulled out from the slot 111 and separated from the circuit board 100, the circuit board 100 returns to a state of FIG. 5B (i.e., a state of the circuit board 100 in which the expansion card 10 has not been inserted), allowing the user to reinsert the expansion card 10 into the circuit board 100.

In this way, the expansion card 10 inserted into the slot 111 may move upward without being restrained by the blocking part BP, thereby releasing the limit of the positioning part 11 of the expansion card 10 by the blocking part BP. Such a design may enable the user to release the expansion card 10 without continuously pressing the force applying part 134 when releasing or replacing the expansion card 10, which is convenient for the user to operate and has a good user experience.

Based on the above, in the circuit board of the disclosure, the release assembly moves relative to the slot by pressing the force applying part of the transmission mechanism, and through the configuration of the blocking member and the elastic member in the release assembly, when the release assembly moves relative to the slot, the blocking member is driven to push against the positioning part of the expansion card to move out of the blocking part, so as to be located at the release position continuously. In this way, the user does not need to continuously press the force applying part to release the expansion card, which is convenient for the user to operate and has the good user experience.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A circuit board, suitable for inserting an expansion card, wherein the expansion card comprises a positioning part, and the circuit board comprises:
- a board body;
- a slot, disposed on the board body;
- a release assembly, movably disposed beside the slot along a first direction, and comprising:
  - a release body, comprising a blocking part suitable for limiting the positioning part;
  - a blocking member, pivotally connected to the release body; and
  - an elastic member, connected between the release body and the blocking member; and
- a transmission mechanism, comprising a linkage part and a force applying part that are linked with each other, wherein the linkage part is connected to the release assembly, wherein
- when the force applying part receives an external force, the linkage part moves to move the release assembly toward the first direction, the elastic member returns to an original position to drive the blocking member to push against the positioning part to move out of the blocking part and to be located at a release position continuously, so as to release limiting of the positioning part by the blocking part.

2. The circuit board according to claim 1, wherein the release body comprises a first inclined surface, when the expansion card is inserted into the slot along a second direction and is not limited by the blocking part, the positioning part pushes against the first inclined surface and the blocking member, the release assembly moves toward the first direction, the blocking member pivots relative to the release body, and the second direction is different from the first direction.

3. The circuit board according to claim 1, wherein when the expansion card is inserted into the slot along a second direction and is limited by the blocking part, the release assembly moves toward a third direction opposite to the first direction, and the positioning part pushes against the blocking member and pivots relative to the release body, and the second direction is different from the first direction.

4. The circuit board according to claim 1, wherein the transmission mechanism further comprises a base body and an upper cover disposed on the base body, the base body is fixed to the board body, and the linkage part is movably disposed between the base body and the upper cover.

5. The circuit board according to claim 4, wherein the force applying part comprises a button movably disposed on the base body along a second direction, and the second direction is different from the first direction.

6. The circuit board according to claim 5, wherein the button comprises a second inclined surface, and the linkage part comprises a third inclined surface corresponding to the second inclined surface.

7. The circuit board according to claim 4, wherein the transmission mechanism further comprises an elastic member, and the elastic member is located between the base body and the upper cover, extends along the first direction, and presses against the linkage part.

8. The circuit board according to claim 1, wherein the linking part comprises a first part and a second part connected to the first part in a bending manner, the release assembly is connected to the first part, and the force applying part is close to the second part.

9. The circuit board according to claim 8, wherein the slot and the first part extend along the first direction, and the force applying part is staggered from an extension line of the slot.

* * * * *